(12) United States Patent  
Fiske

(10) Patent No.: US 7,042,587 B2
(45) Date of Patent: May 9, 2006

(54) IMAGE DATA CACHING

(75) Inventor: Scott Fiske, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 980 days.

(21) Appl. No.: 09/994,770

(22) Filed: Nov. 28, 2001

(65) Prior Publication Data

US 2003/0098987 A1     May 29, 2003

(51) Int. Cl.
*G06F 15/00*     (2006.01)
*G06F 15/16*     (2006.01)
*B41J 5/30*      (2006.01)

(52) U.S. Cl. .................. 358/1.15; 709/223; 400/63

(58) Field of Classification Search .............. 358/1.15, 358/2.1, 504, 536; 709/223, 227; 715/513, 715/764; 382/125; 400/62, 63, 70; 348/103, 348/135
See application file for complete search history.

(56) References Cited

U.S. PATENT DOCUMENTS 5,727,220 A * 3/1998 Hohensee et al. .......... 715/513

* cited by examiner

*Primary Examiner*—Kimberly Williams
*Assistant Examiner*—Saeid Ebrahimi-Dehkordy

(57) ABSTRACT

Methods for caching rasterized image data are provided. A representative method includes: receiving image data; searching for rasterized image data that corresponds to the image data; if the rasterized image data corresponding to the image data is not found during searching; rasterizing the image data to form rasterized information; and storing the rasterized information. Systems, devices, computer readable media and other methods are also provided.

18 Claims, 8 Drawing Sheets

IMAGE DATA CACHING

BACKGROUND OF THE INVENTION

1. Field of the Invention

The present invention is generally related to printing and, more particularly, to systems and methods for caching rasterized image data for printing.

2. Description of the Related Art

Generally, a printer can translate information received electronically from a computing device and print the translated information onto paper. Over the years, printers have improved with regard to printing speed as well as other capabilities. For example, several years ago, printers only had the capability of printing text in one color. Today, detailed images can be printed and in many colors. Advancements in computing devices as well as the printers have made this possible. The method in which the information is sent from the computing device to the printer has also greatly developed over this time period.

By way of example, network communication has changed the relationship between computing devices and printers. Today, some printers, typically high-end printers, include hardware components that originally were only in the computing devices. For example, memory elements, such as hard drives, are now incorporated into some printers. This can enable less communication to occur between the computing devices and the printers when performing printing. This can be beneficial because communication links between computing devices and printers can be a great bottleneck in the delivery of the information to be printed.

The processing of the image information has also made great strides. However, one aspect of image information processing tends to be time-consuming. In particular, providing information to the printers' electronic and mechanical components, (commonly referred to as the "printer engine") in a format that can be interpreted by the printer engine takes time. This is because the image information that a computing device generates, typically, cannot be interpreted directly by the printer engine. Therefore, the information to be printed, typically, is processed into a format suited for the printer engine. This process is generally known as "rasterizing."

When an application in a computing device sends a print job to the printer for printing, the print job could include, for example, information corresponding to the number of copies, the media, and the image data that is to be printed. The text and image data is usually stored in a temporary file that is passed to the printer and is configured in a way the printer engine cannot directly interpret. These formats are known in the art as Page Description Languages (PDLs). Examples of these various formats are: Postscript (PS) and Printer Control Language (PCL5e and PCL6). Each PDL may have different characteristics, e.g., a PDL may store the image data in a more compressed format or require less computation to store and/or read than another PDL. Additionally, some current printers are designed to process particular types of compressed graphic files instead of, or in addition to, PDL. One example of a compressed graphic file type, which some printers may be designed to process, is Moving Pictures Expert Group (MPEG).

Reference is now made to FIG. 1, which is a flowchart illustrating a process in which image data is converted into a format in which a printer can interpret. As shown in FIG. 1, the process begins when a file is received in a PDL format (block 10). The file could be converted into a language the printer can interpret by a process known as Raster Image Processing (RIP) or rasterizing (block 20). In short, RIP or "rasterizing" changes text and graphics commands into descriptions of each mark on a page. Typically, this process requires large amounts of mathematical computation and processing power.

The rasterization process produces information that is in a format the printer engine can interpret. This format is known as an "engine-ready format," meaning the image information is now ready for a printing engine to render it to a printed page (block 30).

Rendering typically is done in the printer engine itself, but the rasterizing process may or may not occur in the printer. For example, the image data may be rasterized external to the printer and the image information can be sent to the printer in an engine-ready format. With respect to externally rasterized image data, reduction in rasterization times conventionally has included relying on improvements in processing speeds. However, there may be other ways to reduce rasterization time when the user desires printing.

Based on the foregoing, it should be appreciated that there is a need for improved methods and systems that address the aforementioned and/or other shortcomings of the prior art.

SUMMARY OF THE INVENTION

The present invention relates to caching rasterized image data. In this regard, a representative method for caching rasterized image data includes: receiving image data; searching for rasterized image data that corresponds to the image data; if the rasterized image data corresponding to the image data is not found during searching, rasterizing the image data to form rasterized information; and storing the rasterized information.

Other embodiments of the invention may be construed as systems for caching rasterized image data. In this regard, a representative system includes programmable logic configured to search for rasterized image data corresponding to received image data. The system also includes a Raster Image Processor (RIP) configured to rasterize the image data into rasterized information, if the rasterized image data corresponding to the image data is not found.

Embodiments of the invention may be construed as computer readable media. In this regard, a representative computer readable medium includes: first programmable logic configured to search for rasterized image data corresponding to image data; second programmable logic configured to rasterize the image data into rasterized information, if the rasterized image data corresponding to the image data is not found; and third programmable logic configured to store the rasterized information.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

As will be described in greater detail herein, image data caching systems and methods of the invention can potentially reduce the amount of time typically associated with rasterization of image data when the image data is to be printed. In some embodiments, this can be accomplished by caching rasterized image data so that it is readily retrievable when information corresponding to a request for printing is received. In particular, when image data, such as PDL or graphic image data, is received, a search for corresponding rasterized image data can be conducted. If rasterized image data is not found, the received image data can be rasterized and then stored and/or cataloged for later use. If, however, rasterized image data is found, the rasterized image data that was found can be used for printing. In this manner, the workload of the Raster Image Processor (RIP) can be reduced, thereby potentially increasing the overall speed of the printing process.

Figure 2:
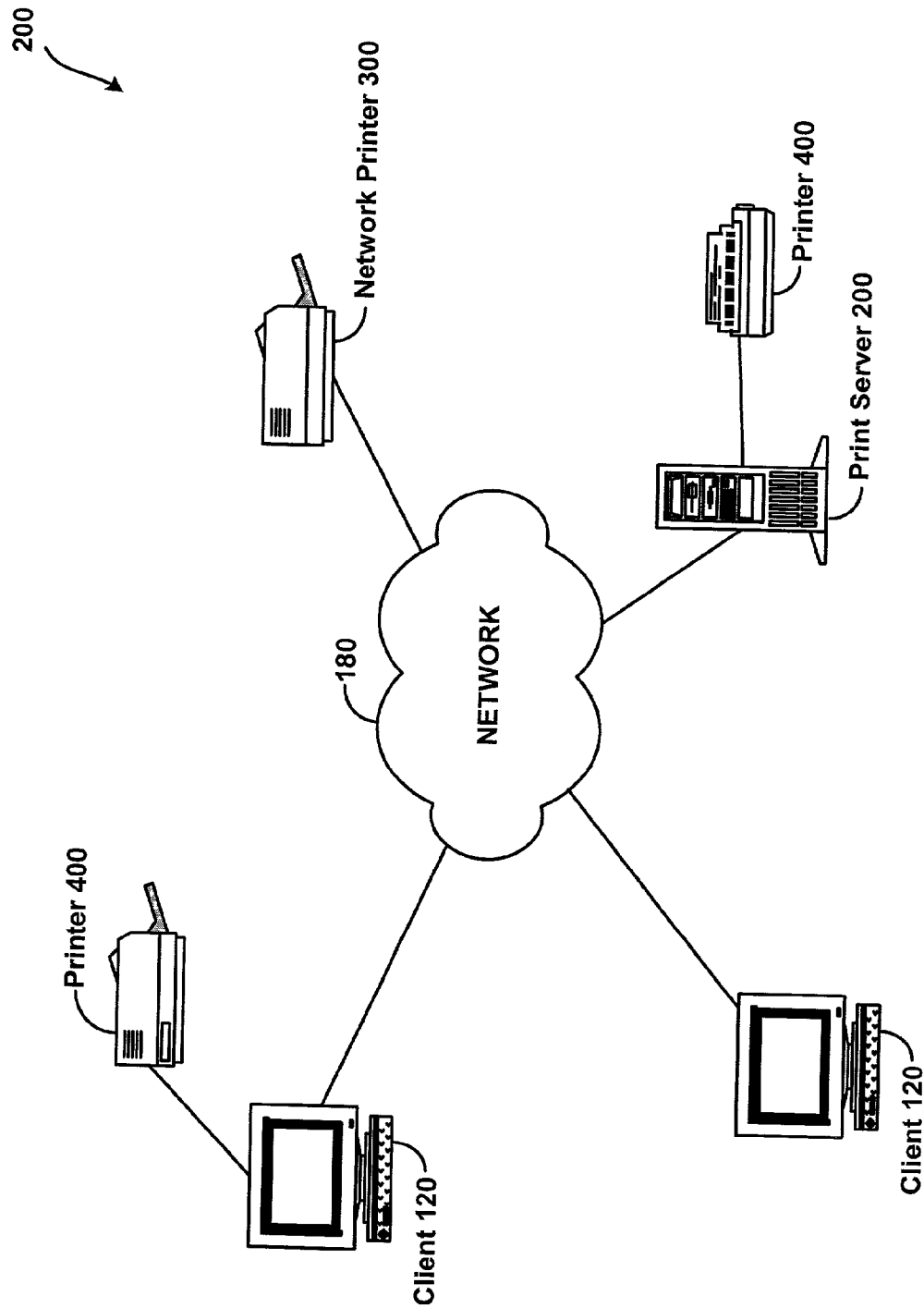
FIG. 2 is a depiction of a computer network in which embodiments of the image data caching system of the present invention may be implemented.

FIG. 2 is a depiction of a computer network 200 in which embodiments of the image data caching system of the present invention may be implemented. The computer network 200 may comprise a network 180 in which various computing devices are interconnected. For instance, in FIG. 2, a network printer 300 is connected with the network 180, as well as a print server 200 and a client device 120. A printer 400 may be indirectly connected to the network 180 via the print server 200 or the client device 120.

The network 180 may be any type of communication network in which various computing devices can communicate. For example, but not limited to, the network 180 could be a Local Area Network (LAN) or a Wide Area Network (WAN) and could utilize the internet. The network 180 could be comprised of various hardware components such as routers and bridges (not shown) to facilitate the communication between the various interconnected devices.

Figure 1:
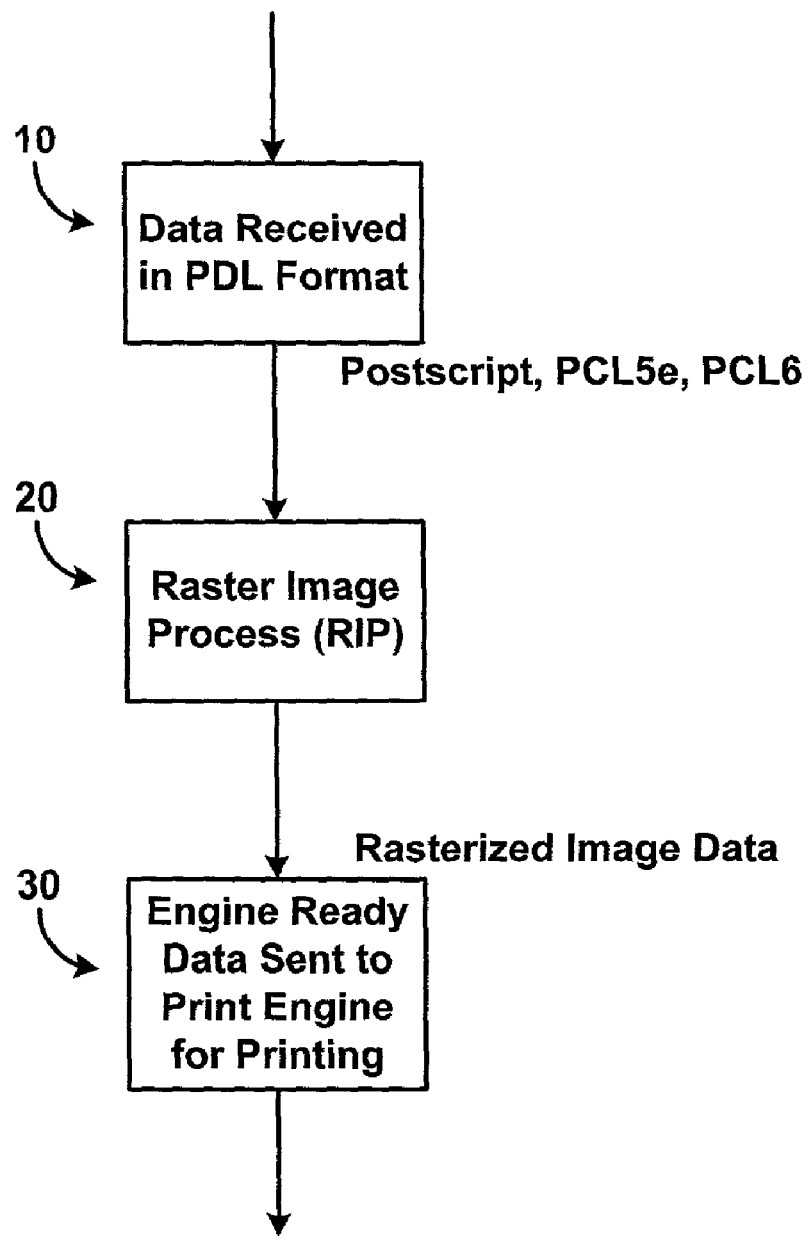
FIG. 1 is a flowchart illustrating a prior art process in which received PDL or compressed graphic data is converted into a format that can be interpreted by a printer engine.

The network printer 300 is similar to the printer 400 except that the network printer 300 has the capability to communicate with the network 180 directly, whereas the printer 400 may only communicate with the network 180 indirectly. In both cases, the hardware and/or firmware required to perform the RIP process (See FIG. 1) may be housed locally, within the printer, or remotely in another device.

The print server 200, typically, is a server that is dedicated to track the various print jobs being sent to the printer 400 from other devices connected to the network 180. Oftentimes, the print server 200 can track and process the various print jobs without user interaction.

The client device 120, typically is a workstation or desktop computer that is operated by a user. Most applications that send print jobs for printing reside at the client device 120. The client device 120 may be in direct communication with a printer 400 via parallel port communication or USB port communication, among others. The client device 120 may also, simultaneously, be in indirect communication with a network printer 300 via the network 180.

In some embodiments of the present invention, the image data caching system may be located directly in the network printer 300 or the printer 400. In other embodiments, the image data caching system may be located in the client device 120 and/or the print server 200, in which case the client device 120 and/or the print server 200 are either directly coupled with the printer 400 or indirectly coupled with the network printer 300 via the network 180.

Figure 3:
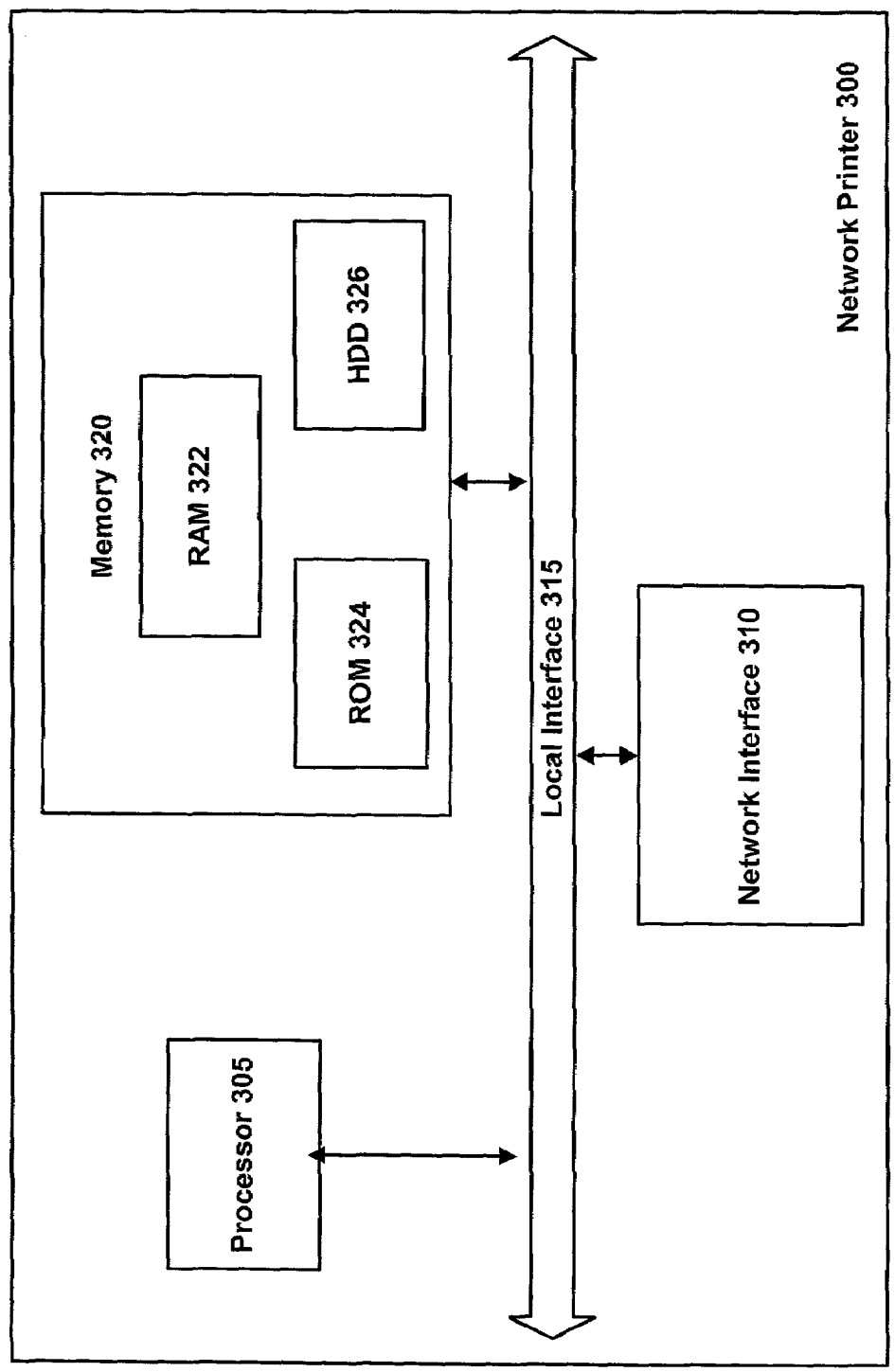
FIG. 3 is a block diagram illustrating a network printer found in the computer network of FIG. 2 wherein an embodiment of the image data caching system may be implemented.

Turning now to FIG. 3, which is a block diagram illustrating a network printer 300 found in the computer network 200 of FIG. 2, an embodiment of the image data caching system will now be described. In this embodiment, the network printer 300 may include a processor 305, memory 320, and a network interface 310 all coupled via a local interface 315.

The local interface 315 can be, for example, but not limited to, one or more buses or other wired or wireless connections, as is known in the art. The local interface 315 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 305 is a hardware device for executing software or firmware, particularly that stored in memory 320. The processor 305 can be any custom made or commercially available processor, a central processing unit (CPU), an auxiliary processor among several processors associated with the network printer 300, a semiconductor based microprocessor (in the form of a microchip or chip set), a macro processor, or generally any device for executing software instructions.

The memory 320 can include any one or combination of volatile memory elements (e.g., random access memory (RAM, such as DRAM, SRAM, SDRAM, etc.)) and nonvolatile memory elements (e.g., hard disk drive, tape, NVRAM, CDROM, etc.). Moreover, the memory 320 may incorporate electronic, magnetic, optical, and/or other types of storage media. Note that the memory 320 can have a distributed architecture, where various components are situated remote from one another, but can be accessed by the processor 305. The present embodiment makes use of read-only memory (ROM) element 324, a hard disk drive (HDD) element 326 and a random access memory (RAM) element 322. The resources required to perform the rasterization process as well as the rendering process may be stored in either of the two elements. The programmable logic, e.g., firmware and/or software, required to operate the image caching system of the present invention could also reside in one or both of these elements.

The network interface 310 could be a modem or network card wherein communication with the network 180 can be established. Other components are incorporated within the network printer 300, such as the mechanical components required to perform the printing, but have been excluded for simplicity.

Figure 4:
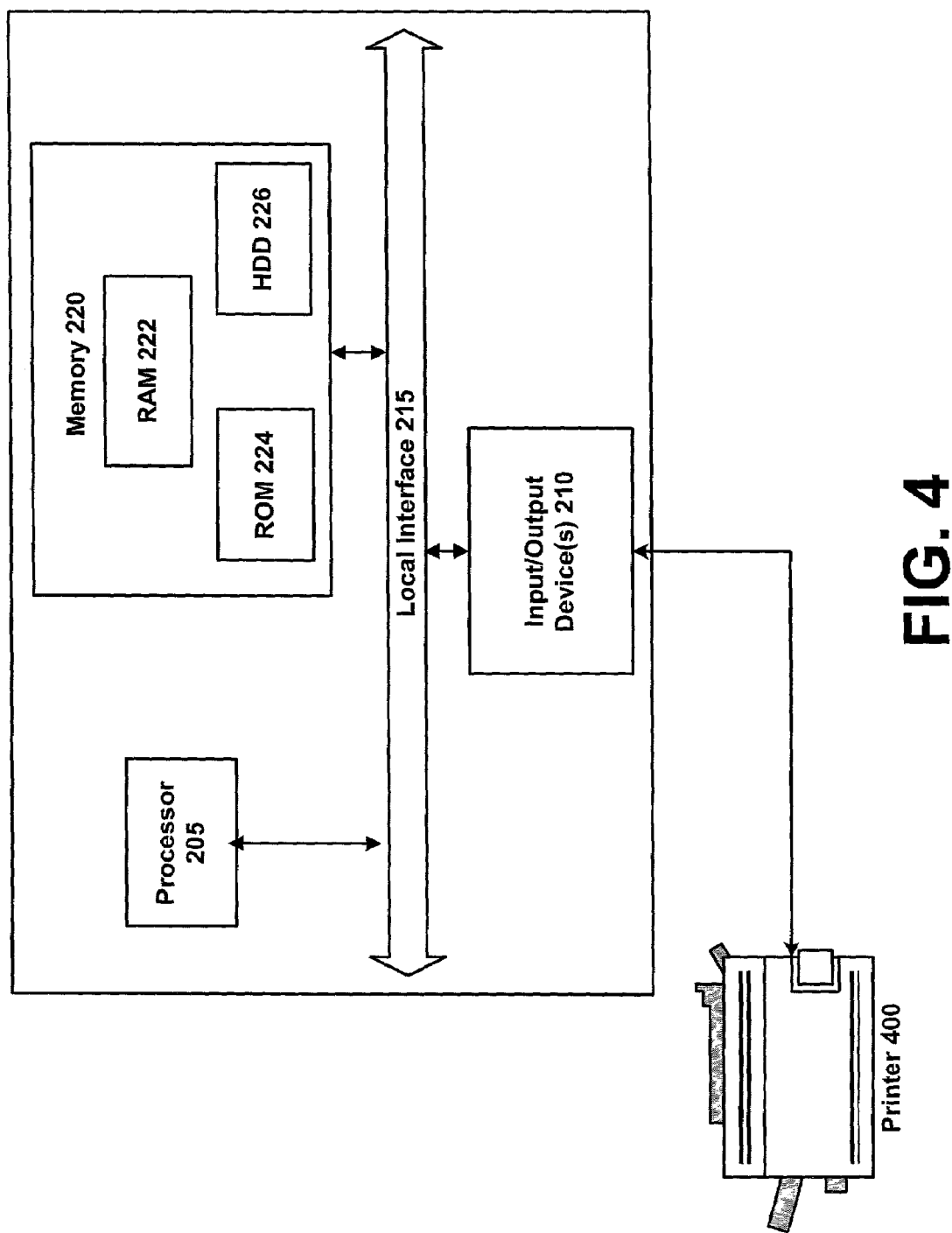
FIG. 4 is a block diagram illustrating another embodiment of the image data caching system.

FIG. 4 is a block diagram illustrating another embodiment of the image data caching system. In this embodiment, the print server 200 is directly coupled with the printer 400 and may include a processor 205, memory 220, and an Input/

Output (I/O) device 210 all coupled via a local interface 215. The print server 200 may be in communication with the network 180 (See FIG. 2) via a network interface (not shown).

The local interface 215 may be, for example, but not limited to, one or more buses or other wired or wireless connections, as is known in the art. The local interface 215 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 205 is a hardware device for executing software or firmware that is stored in memory 220. The processor 205 can be any custom made or commercially available processor, a central processing unit (CPU), an auxiliary processor among several processors associated with the print server 200, a semiconductor based microprocessor (in the form of a microchip or chip set), a macro processor, or generally any device for executing software instructions.

The memory 220 can include any one or combination of volatile memory elements (e.g., random access memory (RAM, such as DRAM, SRAM, SDRAM, etc.)) and nonvolatile memory elements (e.g., read-only memory (ROM), hard disk drive (HDD), tape, NVRAM, CDROM, etc.). Moreover, the memory 220 may incorporate electronic, magnetic, optical, and/or other types of storage media. Note that the memory 220 can have a distributed architecture, where various components are situated remote from one another, but can be accessed by the processor 205. The present embodiment makes use of read-only memory (ROM) element 224, a hard disk drive (HDD) element 226 and a random access memory (RAM) element 222. Along with the resources required for tracking the various print jobs sent from the network 180, the resources required to perform the rasterization process as well as the rendering process may be stored in either of the two elements. The programmable logic, e.g., firmware and/or software, required to operate the image caching system of the present invention could also reside in one or both of these elements.

The I/O device 210, may be, for example, but not limited to, a parallel printer port, USB port or serial port. A complementary device would be located in the printer 400 and the two devices could be coupled together by a printer cable to facilitate the communication between the two devices. If the rasterization process were performed at the print server 200, the engine ready format of the image information would be communicated to the printer 400 via the I/O device 210.

In another embodiment, the client device 120 (See FIG. 2) in communication with the printer 400 may comprise the components of the print server 200 described above and the image caching system may be stored in the memory of the client device 120.

Figure 5:
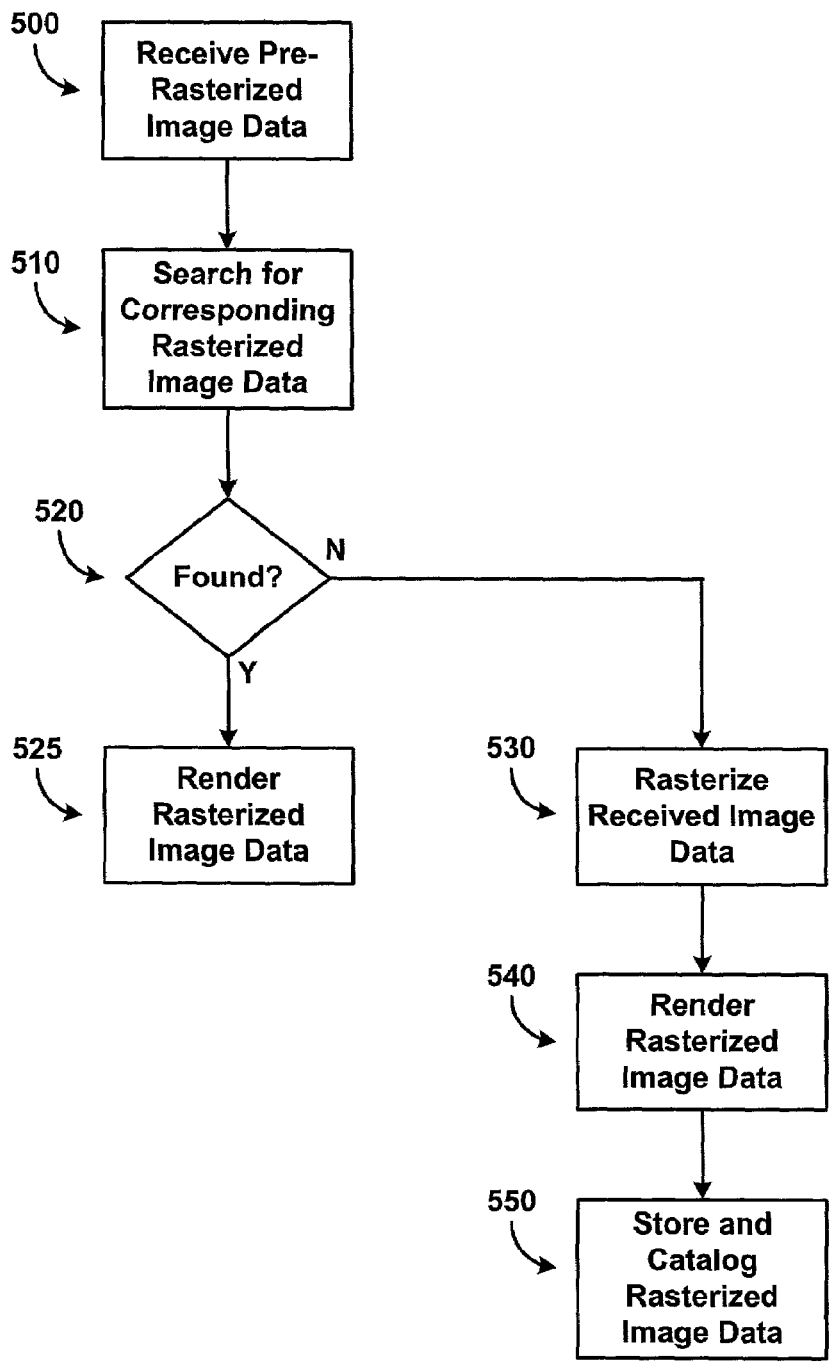
FIG. 5 is a functional flowchart illustrating functionality of an embodiment of a method of the present invention.

FIG. 5 is a flowchart depicting functionality of an embodiment of the image caching system or method of the present invention. As shown in FIG. 5, the method begins when a page to be printed is received in PDL, or other pre-rasterized, format (block 500). For instance, the network printer 300 (FIG. 3), print server 200 (FIG. 4), or other device hosting the image caching system may receive PDL page data from an application. A search is performed to determine if a page corresponding, e.g., identical, to the newly received page has been previously rasterized (block 510). If previously rasterized image data is found (block 520), the previously rasterized image data is retrieved for rendering (block 525). By way of example, a search algorithm could be incorporated into the programmable logic of the image caching system and stored on the ROM 324 or 224. This eliminates the need to re-rasterize the image data, a process that can be very cumbersome and consume extensive computing power as described earlier.

Returning to block 520, if rasterized image data corresponding to the page is not found, the received image data is rasterized by the RIP (block 540) and then is rendered (block 540). The engine ready rasterized data produced by the RIP could then be stored and/or cataloged for later use (block 550).

Note, image data of a size representing a printed page is used in the aforementioned embodiment of the present invention because current printer engines typically render image data one page at a time. However, other forms of image data could be used. For example, a print job could contain several pages of text and/or images. The image data could then be divided into segments relative to each page and a determination made as to whether image data corresponding to each of the segments has been previously rasterized. For instance, image data corresponding to a four-page document could be received, rasterized and stored. In response to receiving image data corresponding to the four-page document again, wherein a portion of one of the pages has been edited, only the edited page or segment could be rasterized. Thus, the pre-rasterized image data corresponding to the other segments of the document could be found and used.

Image data caching methods of the invention also could improve efficiencies in printing multiple copies. For example, if a print job requires image data to be printed N-times, the image data could be received, the rasterized image data corresponding to the image data received could either be retrieved or generated and then rendered. In all, the print job would require, at most, one rasterization step, and possibly none, if the rasterized image data was previously stored.

Figure 6:
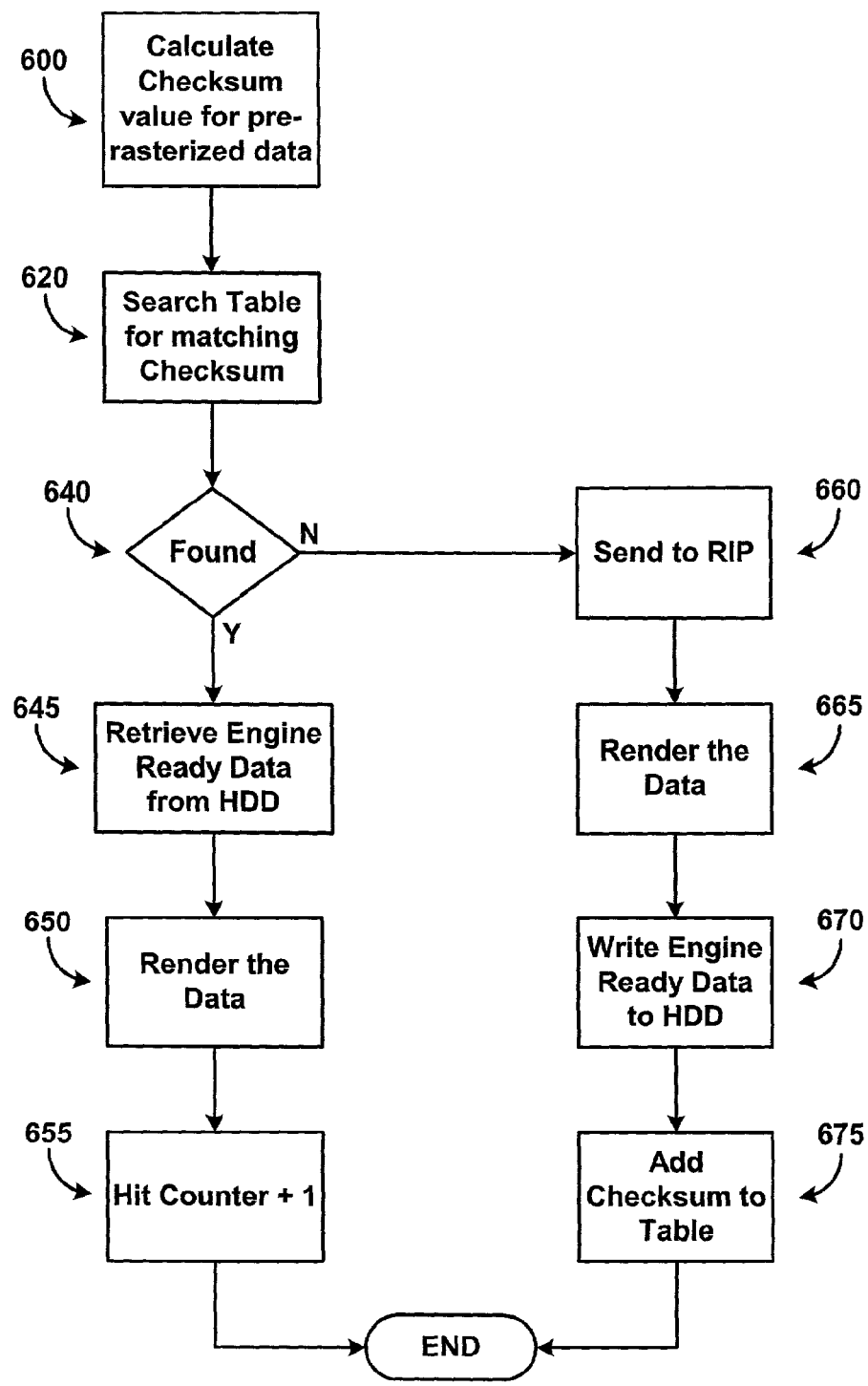
FIG. 6 is a functional flowchart of a method for caching image data.

Reference is now made to FIG. 6, which is a flowchart depicting functionality of another embodiment of the image data caching system (or method) of the invention. As shown in FIG. 3, the method begins when image data from a print job is received and a Checksum value, which uniquely identifies the content of the page, is calculated and assigned to the newly received page data (block 600). By way of example, cyclic redundancy check (CRC) or other algorithm can be used to calculate the Checksum value. CRC is a known technique for performing error checking on electronically transmitted or magnetically recorded data. A CRC code is generated based on the content of a block of data to be transmitted or stored, and transmitted or stored with the data. At the receiving or reading-end, a matching CRC algorithm is used to generate a code. If the newly generated code matches the code that was received or read, then it is assured that no error has occurred. Checksum is known in the art as a value, generated by a CRC or other algorithm, which can be used to uniquely identify the content of a file or block of data.

Like the Checksum values used in uniquely identifying a block of data that has been transmitted or stored, embodiments of the present invention could use Checksum values to identify pages received that have previously been rasterized. Preferably, the Checksum values are stored in a Table and correspond to previously rasterized engine ready page files stored in non-volatile memory. For example, such a Table could take the form of a data structure that is capable of storing information and being traversed, such as a hash table or a binary tree. Typically, the data structure (Table) would be stored in the RAM 322 or 222 of either the network printer 300 or the print server 200, respectively. Data entries of the Table could contain the file names and locations of the rasterized image data corresponding to particular Checksum values.

Returning to FIG. 6, upon receiving a new PDL or graphic page and computing the corresponding Checksum value, the Table is searched (block 620). If the CRC code generated for the received image data matches one stored in the Table (thus, a "hit") (block 640), the rasterized image data could be retrieved from the HDD 326 or 226 by using the file name and location stored in the corresponding data entry (block 645). At that point, the previously rasterized or engine ready image data could be rendered by the printing engine (block 650). A "cache hit counter" could then be incremented to signify the "hit." The cache hit counter could be used to track the number of successful hits, which could be used to determine the effectiveness of the image data caching system. This determination could be made automatically by a computing device or by a network administrator monitoring the system.

Upon a "miss," i.e., the CRC code generated for the received image data does not match one stored in the Table, the image data could be sent to the RIP for rasterizing (block 660). Once rasterization is complete, the rasterized image information could be rendered by the printing engine (block 665). The rasterized image data could then be assigned a file name and location and stored on the hard disk 326 or 226 (block 670). The file name could be defined by the Checksum value assigned to the corresponding image data. Upon storing the rasterized image data, the data would be cataloged by adding an entry to the Table. For instance, the data entry could contain the Checksum value, file name, and file location of the rasterized image information (block 675). Periodically, the HDD 326 or 226 and the Table stored in RAM 322 and 222 could be purged to eliminate information that has not been recently used.

Figure 7:
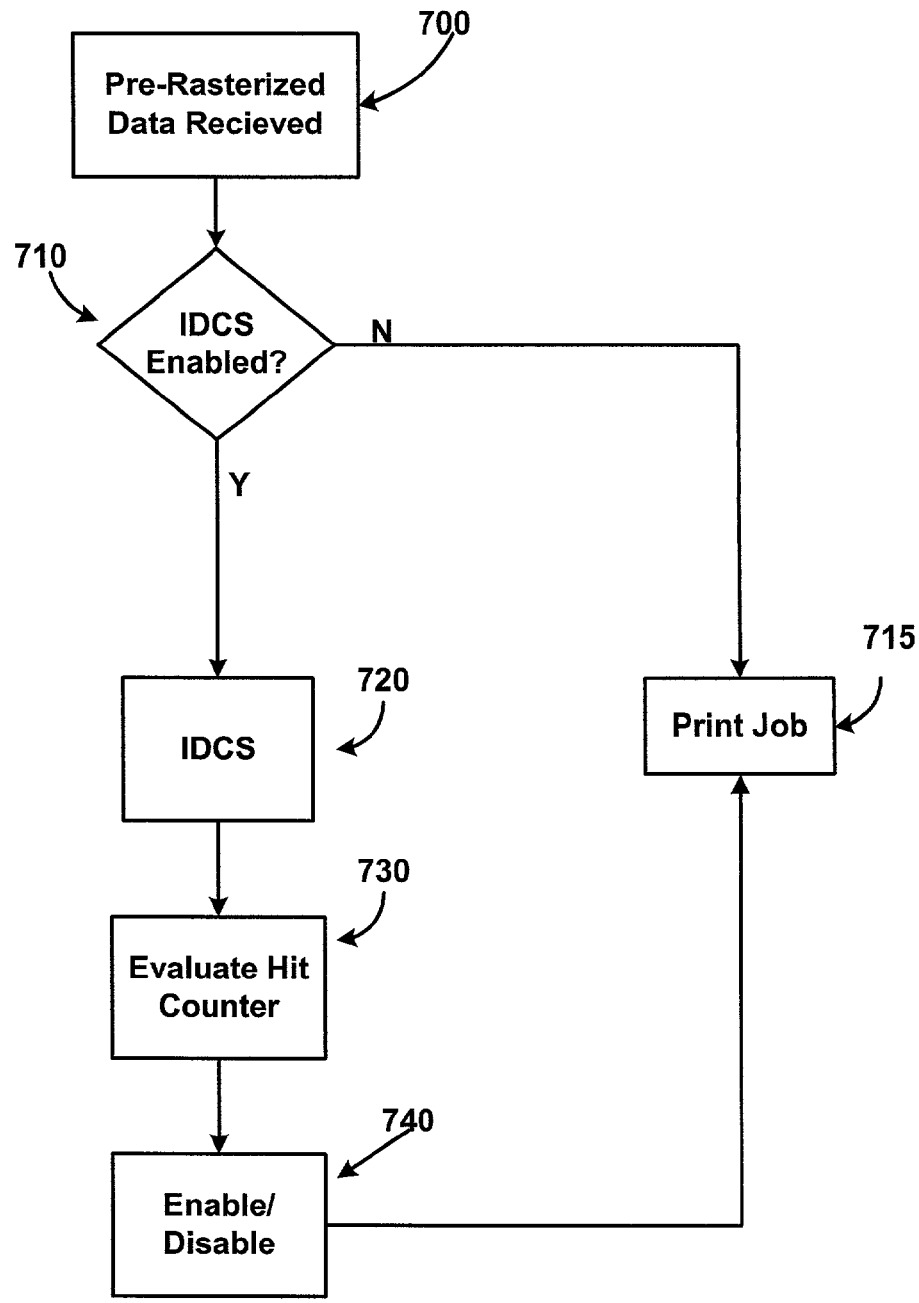
FIG. 7 is a functional flowchart of a method for enabling and disabling the image data caching system.

FIG. 7 is a flowchart depicting functionality of another embodiment of the image data caching system or method. In FIG. 7, the method begins when a print command is received by an application (block 700). The image data caching system can then be verified to determine whether caching functionality is enabled (block 710). If it is determined that caching functionality is not enabled, the print job can proceed to block 715. In Particular, the image data can be processed by an RIP and then rendered (See FIG. 1). If caching functionality is enabled, the process may proceed to block 720, where the image data may be processed, such as described hereinbefore in relation to the flowchart of FIG. 6.

In block 730, data from the "cache hit counter" (See FIG. 6) and data tracking the number of overall print jobs could be used to evaluate the effectiveness of the image data caching system. In block 740, caching functionality can be disabled, as mentioned earlier, such as if it is determined that caching functionality has not resulted in an overall improvement in printing efficiency. By way of example, a computing device or network administrator could monitor the effectiveness of the image data caching system and manually enable, disable, or adjust parameters of the image caching system.

Figure 8:
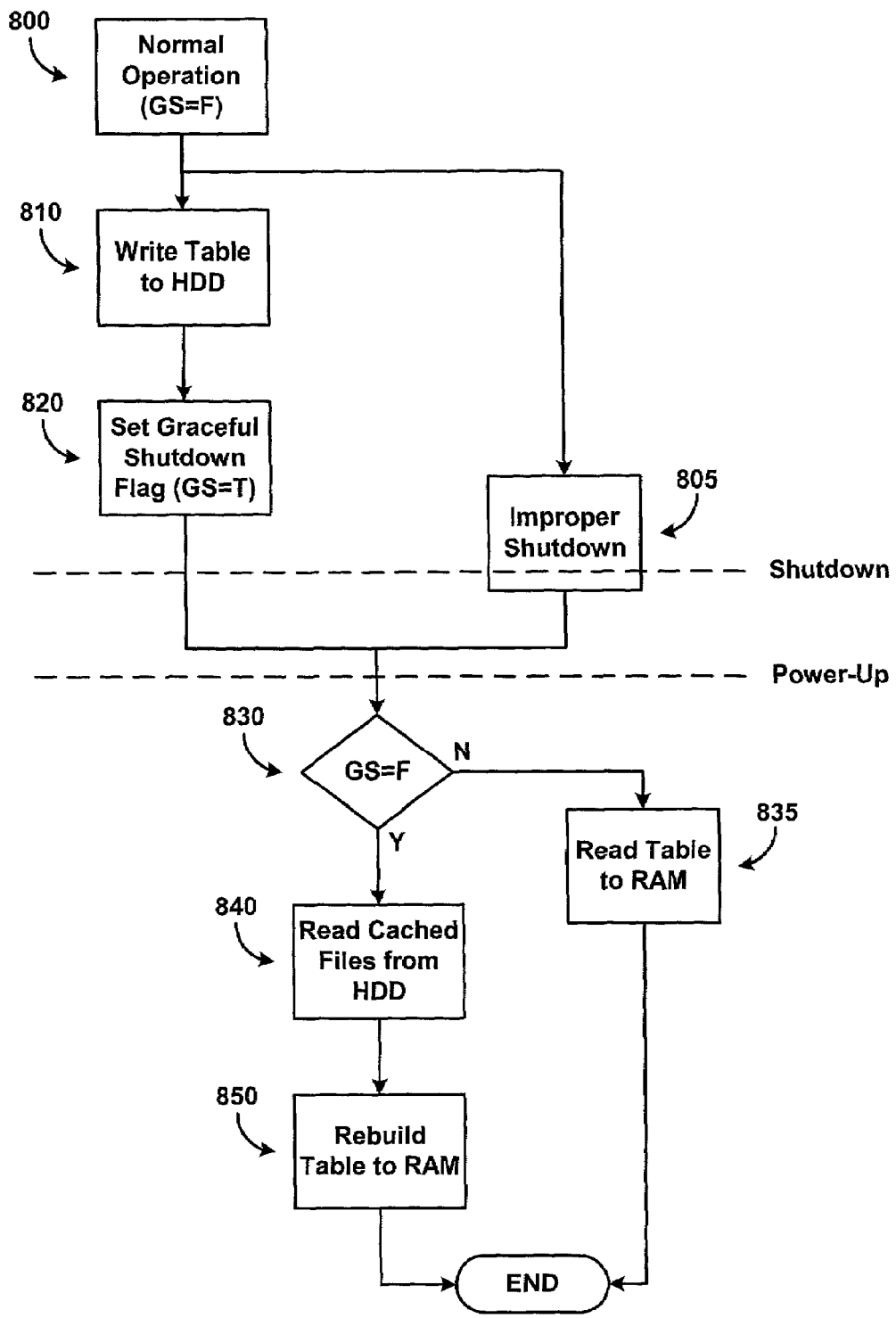
FIG. 8 is a functional flowchart of a shutdown and start-up routine that may be encompassed in an embodiment of the present invention.

FIG. 8 is a functional flowchart of a shutdown and start-up routine that may be encompassed in an embodiment of the present invention. In this regard, it may be important for a Table used with the image caching system that contained file names and/or file locations to be able to sustain a shutdown and start-up sequence. One possible way of accomplishing this is by storing the Table in non-volatile random access memory (NVRAM). This type of RAM can sustain a shutdown/startup routine without losing what was stored. The method described in relation to FIG. 8 considers proper shutdown as well as improper shutdown modes of operation.

Upon normal operation of a device, whether it be the network printer 300 or the print server 200, a "Graceful Shutdown" (GS) flag may be in its default state (block 800). If a shutdown sequence is initiated, the Table could be written from the RAM 322 or 222 to the HDD 326 or 226, thus generating a backup of the Table (block 810). The GS flag could then be flipped to signify the backup has been created (block 820). If the network printer 300 or the print server 200 were shutdown abruptly, the backup could not be created and, thus, the GS flag typically would not switch from its default state (block 805).

Upon startup, the GS flag may be verified (block 830). If it is determined that a graceful shutdown occurred, the backup of the Table could be read from the hard disk 326 or 226 and written to the RAM 322 or 222 (block 835). If it is determined an improper shutdown occurred, the HDD 326 and 226 could be searched and the Checksum values stored with the recently cached rasterized image data files could be read and used to rebuild the Table.

It will be appreciated that the image data caching systems and/or methods described herein may be implemented in hardware, firmware, software or combinations thereof. In this regard, the image data caching systems and/or methods may comprise ordered listings of executable instructions and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the information system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable media would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), portable compact disc read-only memory (CDROM) (optical), and a hard-disk drive(HDD) (magnetic). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention.

For example, each block of the flowcharts depicted herein represent a module segment or portion of code that comprises one or more executable instructions, or logic for implementing the specified logical function(s). It should also be noted that in some alternative implementations the functions noted in various blocks may occur out of the order in which they are depicted. For example, two blocks shown in succession in FIG. 6 may, in fact, be executed substantially concurrently. In other embodiments, the blocks may sometimes be executed in the reverse order depending upon the functionality involved. All such modifications and variations are intended to be included herein within the scope of the present invention and protected by the following claims.

The invention claimed is:

1. A method for caching rasterized image data, the method comprising of:
   receiving image data;
   searching for rasterized image data that corresponds to the image data;
   rasterizing the image data to form rasterized information, if the rasterized image data corresponding to the image data is not found during searching;
   storing the rasterized information; and
   generating a catalog code, wherein the catalog code is defined by and assigned to the image data;
   wherein searching further comprises searching in a data structure, wherein the data structure is configured to include a data entry with the rasterized image data having the same catalog code as the image data, and wherein the result of a successful search produces a file name and file location of the rasterized image data.

2. The method of claim 1, further comprising of:
   retrieving the rasterized image data from a non-volatile memory element, from the file name and file location of the rasterized image data produced by the search.

3. The method of claim 1, further comprising:
   generating a file name and file location for the rasterized information, wherein the file name is defined by the catalog code.

4. The method of claim 1, wherein storing the rasterized information comprises:
   writing the rasterized information to a file location with a generated file name in a non-volatile memory element; and
   adding the data entry corresponding to the rasterized information to the data structure.

5. The method of claim 1, wherein the data structure is stored in a random access memory (RAM) element.

6. The method of claim 1, further comprising:
   providing a device housing the data structure;
   backing up the data structure to a non-volatile memory element upon proper shutdown of the device,
   retrieving the data structure backed up from the non-volatile memory element upon start-up after a proper shutdown; and
   rebuilding the data structure from the non-volatile memory element upon start-up after an improper shutdown.

7. The method of claim 1, further comprising:
   incrementing a cache hit counter upon successfully finding the rasterized image data corresponding to the image data.

8. The method of claim 1, further comprising:
   rendering the rasterized image data, if the rasterized image data corresponding to the image data is found; and
   rendering the rasterized information, if the rasterized image data corresponding to the image data is not found.

9. An image data caching system comprising:
   first programmable logic configured to search for rasterized image data corresponding to image data;
   a raster image processor configured to rasterize the image data into rasterized information, if the rasterized image data corresponding to the image data is not found;
   second programmable logic configured to store the rasterized information; and
   third programmable logic configured to generate a catalog code defined by and assigned to the image data;
   wherein the first programmable logic is further configured to search a data structure, wherein the data structure is configured to include a data entry with the rasterized image data having the same catalog code as the image data, and wherein the result of a successful search produces a file name and file location of the rasterized image data.

10. The system of claim 9, further comprising:
    a non-volatile memory element configured to store the rasterized image data; and
    fourth programmable logic configured to retrieve the rasterized image data from the non-volatile memory from the file name and file location of the rasterized image data produced by the search.

11. The system of claim 10, further comprising:
    fifth programmable logic configured to generate a file name and file location for the rasterized information, wherein the file name is defined by the catalog code.

12. The system of claim 9, wherein the second programmable logic is further configured to write the rasterized information to a file location with a generated file name to the non-volatile memory and add a new data entry corresponding to the rasterized information to the data structure.

13. The system of claim 9, further comprising:
    a random access memory (RAM) element configured to store the data structure.

14. The system of claim 9, further comprising:
    a non-volatile memory element configured to store a back-up of the data structure;
    sixth programmable logic configured to back-up, upon a proper shutdown, the data structure to the non-volatile memory element, the logic further configured to retrieve, upon start-up after a proper shutdown, the back-up of the data structure from the non-volatile memory, and to rebuild, upon a start-up after an improper shutdown, the data structure from the non-volatile memory element.

15. The system of claim 9, further comprising:
    seventh programmable logic configured to retain a cache hit counter, the programmable logic further configured to increment the cache hit counter upon successfully finding the rasterized image data that corresponds to the image data.

16. The system of claim 9, further comprising:
    a printing engine configured to render at least one of the rasterized image data and the rasterized information.

17. A computer readable medium comprising:
    first programmable logic configured to search for rasterized image data corresponding to image data;
    second programmable logic configured to rasterize the image data into rasterized information, if the rasterized image data corresponding to the image data is not found;

third programmable logic configured to store the rasterized information;

fourth programmable logic configured to generate a catalog code defined by and assigned to the image data; and fifth programmable logic configured to generate a file name and file location for the rasterized information, wherein the file name is defined by the catalog code.

18. The computer readable medium of claim 17, further comprising:

sixth programmable logic configured to back-up, upon a proper shutdown, a data structure associated with the stored information.

* * * * *